United States Patent
Schiller et al.

[11] Patent Number: 6,131,601
[45] Date of Patent: Oct. 17, 2000

[54] FLUID MIXING APPARATUS

[75] Inventors: Steven E. Schiller, Kenosha; Curtis H. Hubmann, Racine, both of Wis.

[73] Assignee: S. C. Johson Commercial Markets, Inc., Sturtevant, Wis.

[21] Appl. No.: 09/326,787

[22] Filed: Jun. 4, 1999

[51] Int. Cl.[7] .................................................. G05D 11/03
[52] U.S. Cl. ...................... 137/101.27; 456/895; 456/907
[58] Field of Search .................................... 137/888, 889, 137/890, 895, 101.27, 456, 907

[56] References Cited

U.S. PATENT DOCUMENTS

| | | | |
|---|---|---|---|
| 611,081 | 9/1898 | Schneible | 137/895 X |
| 3,351,238 | 11/1967 | Gilbertson | 222/23 |
| 3,578,005 | 5/1971 | Bobigny et al. | 173/3 |
| 3,643,688 | 2/1972 | Meinert | 137/556 |
| 4,391,390 | 7/1983 | Howard | 222/136 |
| 4,735,554 | 4/1988 | Phillips II | 417/189 |
| 4,738,541 | 4/1988 | Weber | 366/152 |
| 4,921,129 | 5/1990 | Jones et al. | 222/23 |
| 5,213,694 | 5/1993 | Craig | 137/101.27 X |
| 5,398,733 | 3/1995 | Welch | 141/4 |
| 5,439,020 | 8/1995 | Lockhart | 137/3 |

Primary Examiner—Stephen M. Hepperle
Attorney, Agent, or Firm—Warren R. Bovee; Renee J. Rymarz; Neil E. Hamilton

[57] ABSTRACT

A reduced pressure shut off assembly for an eductor mixing system wherein a vacuum shut off valve is activated by reduced pressure in a reduced pressure line connected to a container for a concentrate. In a preferred embodiment, an eductor and the vacuum shut off valve are positioned on top a vessel for storing a solution of the concentrate. The mixing system with the vacuum shut off valve is especially adapted to being used for mixing a chemical concentrate cleaning composition with water.

12 Claims, 8 Drawing Sheets

FLUID MIXING APPARATUS

CROSS-REFERENCE TO RELATED APPLICATIONS

NONE

STATEMENT REGARDING FEDERALLY SPONSORED RESEARCH OR DEVELOPMENT

NONE

BACKGROUND OF THE INVENTION

1. Technical Field

This invention relates to a fluid mixing apparatus wherein a concentrated composition is aspirated and mixed with a diluent. More particularly, it relates to an automatic shut off assembly for a mixing apparatus wherein the shut off assembly is vacuum operated.

2. Background Art

Eductors are commonly employed to draw a concentrate from a source and mix it with a diluent such as water. A problem arises in making up the solution when an eductor is employed to draw the concentrate into a tank into which it is diluted. If the operator does not observe the container from which the concentrate is being drawn, water can continue to be drawn into the tank without any concentrate. This causes undesired dilution. A shut off valve provides an automatic shut off device to solve this problem.

It is known in the art to provide automatic shut off devices for fluid mixing systems. One such device is disclosed in U.S. Pat. No. 5,398,733 wherein a barrel liner L is drawn into a manifold 14 inlet port 38 to stop the flow of a concentrate.

In U.S. Pat. No. 3,351,238 a pressure activated switch 41 is disclosed in conjunction with an eductor 22 which senses a low supply in a storage vessel 25 to energize an indicating light.

The prior art does not provide an automatic shut off device for an eductor mixing system which is easily adapted to a container of relatively small volume and obviates the use of electricity. Thus, the need exists for an improved shut off device for an eductor mixing system.

The objects of the invention therefore are:

a. Providing an improved shut off device for an eductor mixing system.

b. Providing a shut off device of the foregoing kind which does not rely on electricity for its operation.

c. Providing a shut off device of the foregoing kind which is easily connected to a container for a concentrate as well as a filling vessel.

d. Providing an improved shut off device of the foregoing type which is easily manufactured and assembled.

BRIEF SUMMARY OF THE INVENTION

The foregoing objects are accomplished and the shortcomings of the prior art are overcome by the pressure shut off assembly for a reduced pressure fluid mixing apparatus of this invention which includes a first fluid conduit for connection at a first end to a source of a fluid. An eductor has a fluid inlet, an outlet and a reduced pressure zone with the first fluid conduit connected at a second end to the reduced pressure zone of the eductor. A second conduit is connected at a first end to the first fluid conduit. A reduced pressure shut off valve is connected to the eductor inlet. A fluid intake conduit is connected to the reduced pressure shut off valve and the second conduit is connected at a second end to the reduced pressure shut off valve.

In one aspect, the eductor outlet is constructed and arranged to be sealably positioned in a vessel and there is a second shut off valve connected between the fluid intake conduit and the eductor and in fluid communication therewith.

In another aspect, a third conduit is connected to the second conduit at a first end and in communication with atmospheric pressure at a second end with a valve member connected to the third conduit.

In a preferred embodiment the first, second, and third conduits are connected to a common connector and the first conduit is composed of two sections each connected to the common connector.

In still another aspect the reduced pressure shut off valve includes a vacuum activated magnetically operated valve.

In another preferred embodiment, the reduced pressure shut off assembly for the reduced pressure fluid mixing apparatus includes the first fluid conduit connected to a source of fluid at a first end.

In yet another aspect the first fluid is a chemical concentrate and the fluid intake conduit is connected to a source of water.

In another aspect, the reduced pressure shut off assembly is connected to a storage vessel with the outlet of the eductor placed in an opening at the top of storage vessel and an outlet conduit connected to the storage vessel at the bottom.

Further aspects and advantages of the invention will become apparent from the description of the preferred embodiment which follows:

DETAILED DESCRIPTION OF THE INVENTION

Figure 1:
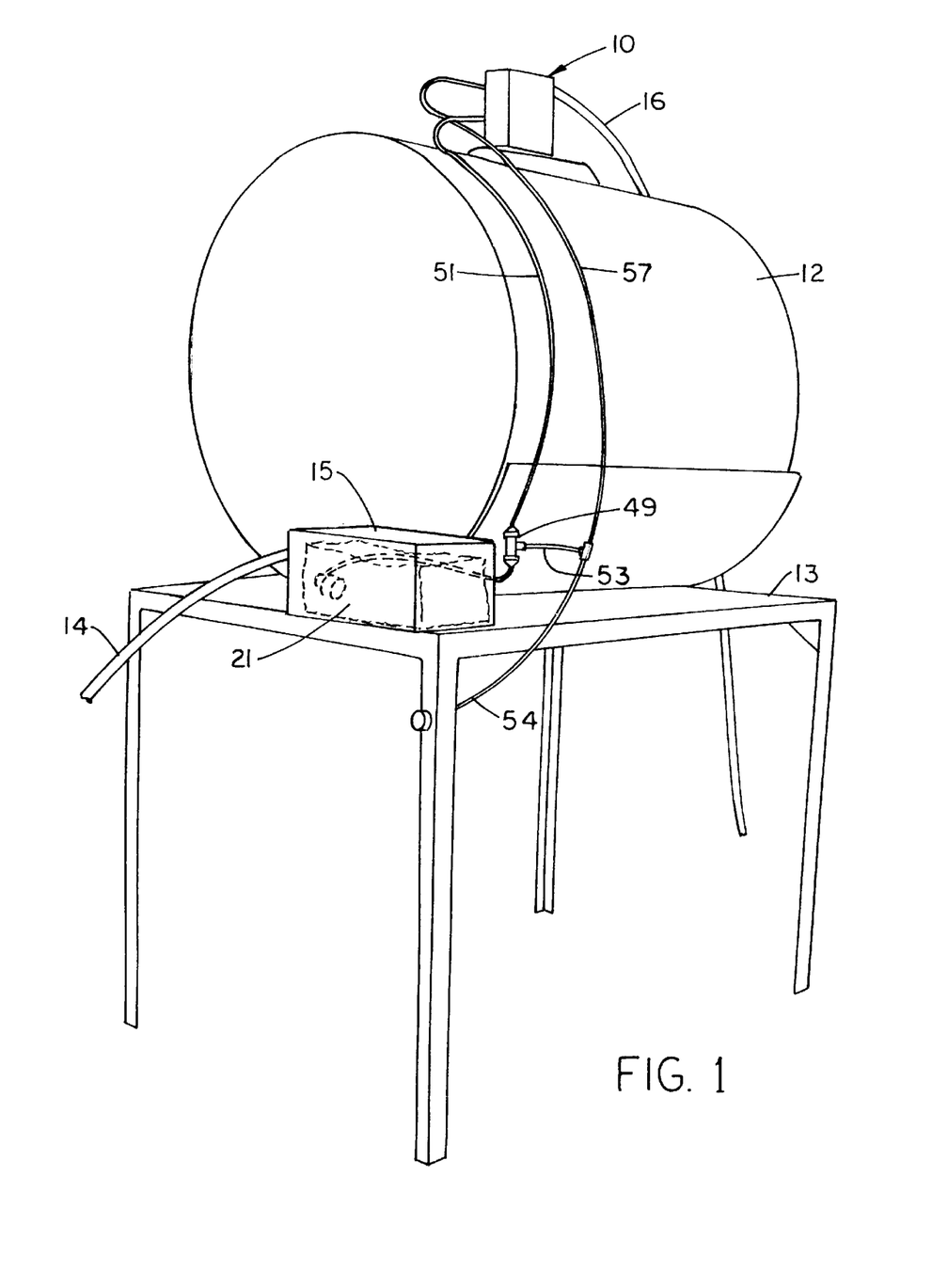
FIG. 1 is a perspective view of the fluid mixing apparatus with the shut off assembly of this invention.
Figure 2:
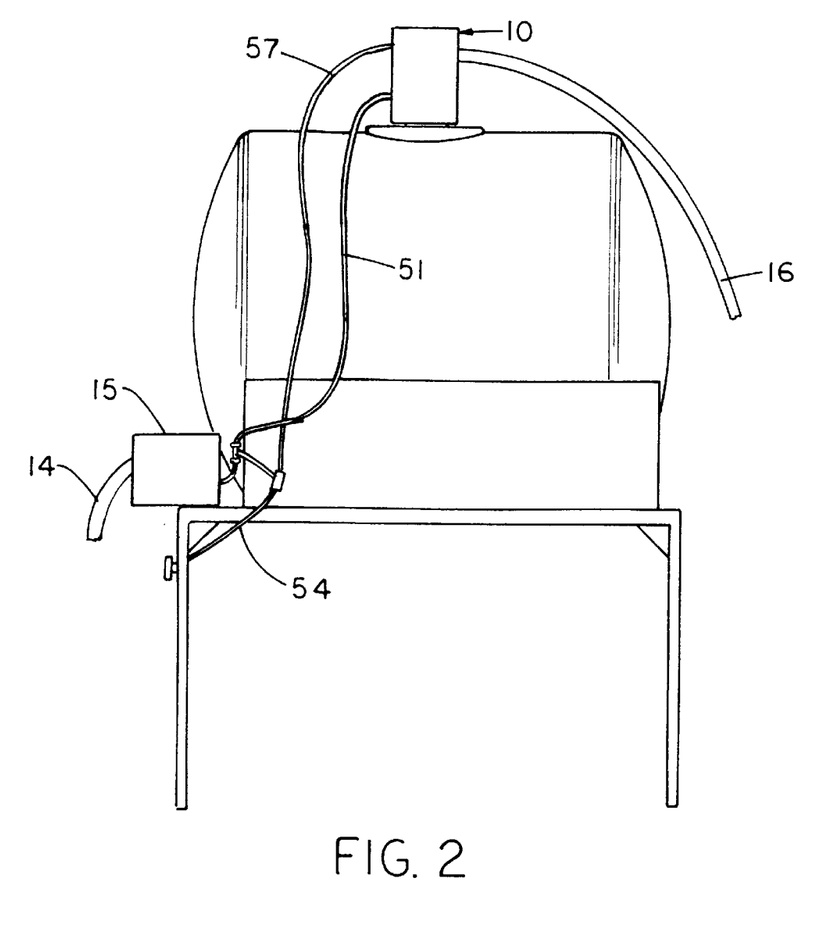
FIG. 2 is a side elevational view of the fluid mixing apparatus shown in FIG. 1.

Referring to FIGS. 1 and 2 the shut off assembly 10 generally is shown in conjunction with a fluid mixing apparatus including a filling tank or vessel 12 supported on a table 13. A drain hose 14 is connected to the tank 12 and a water filling hose 16 is connected to the shut off assembly 10. A container 15 for a concentrated cleaning composition is also supported on table 13. In this instance the cleaning composition is Johnson UHS Cleaner SC, GP Forward™

Cleaner SC and Stride™-Citrus Neutral Cleaner HC, and is available from S. C. Johnson & Son. It is contained in a plastic bag 21.

Figure 3:
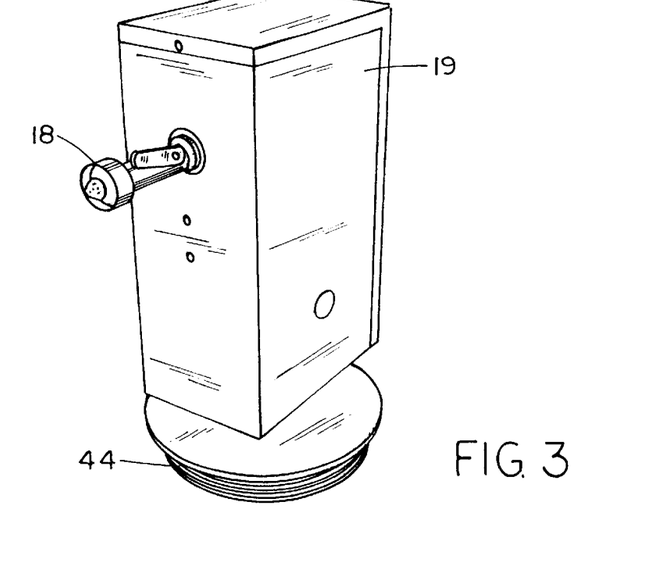
FIG. 3 is a perspective view of a housing for the shut off assembly.
Figure 4:
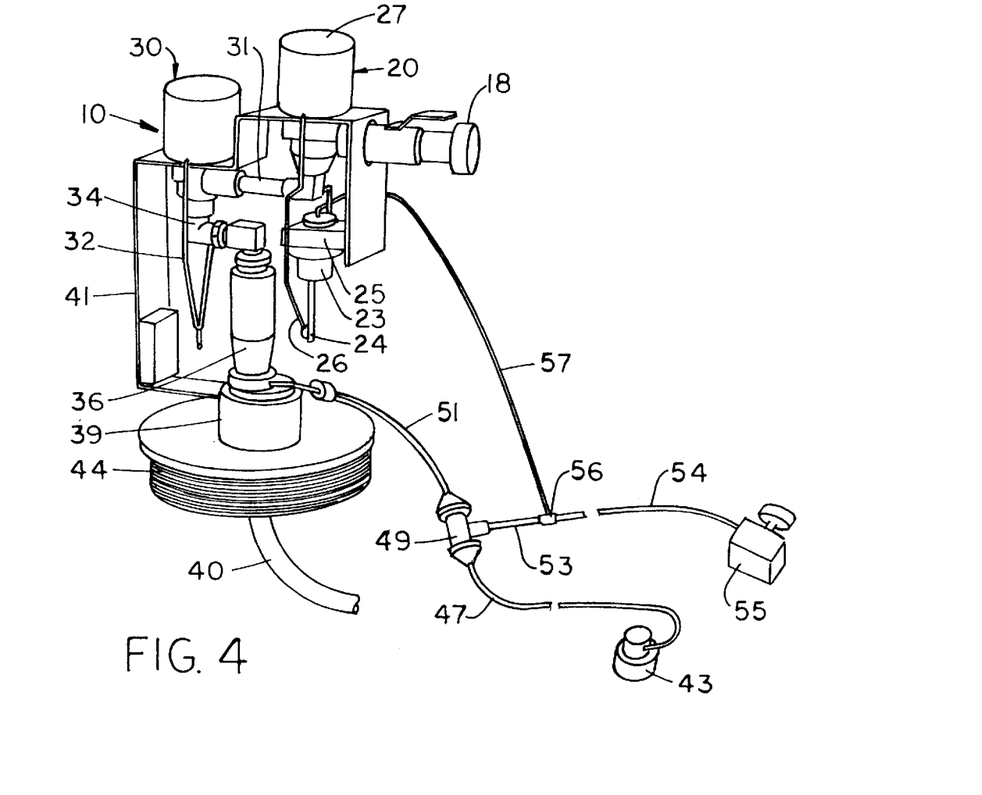
FIG. 4 is a side elevational view of the shut off assembly.

A detailed illustration of the shut off assembly 10 is shown in FIGS. 3–4. Shut off assembly 10 includes an inlet connector 18 for filling hose 16. Connector 18 is in fluid communication with a vacuum shut off valve assembly generally 20 which is preferably a modified Hydro Minder model 506 available from Hydro Systems Company of Cincinnati, Ohio. The modified Hydro Minder model 506 is shown at 27 and is actuated by a vacuum actuator 23 supported by bracket 25. An unmodified Hydro Minder model 506 float valve assembly generally 30 is connected to shut off valve assembly 20 by the conduit 31. Conduit 34 provides a connection between shut off valve assembly 30 and an eductor 36. A preferred eductor is described in application Ser. No. 08/803,488 filed Feb. 20, 1997 and is commonly assigned, the teachings of which are incorporated herein by reference. Eductor 36 is supported on a collar 39 which in turn is connected to bung adapter 44 which affords threaded interconnection to tank 12. Hose 40 is in fluid communication with eductor 36 and is placed inside tank 12 when shut off assembly 10 is placed thereon. A bracket 41 extends from collar 39 and supports shut off valve assemblies 30 and 20. A housing 19 contains the previously described components.

A cap connector 43 provides connection with container 15 and plastic bag 21 as seen in FIG. 1. Conduit 47 extends between cap connector 43 and T-connector 49 with conduit 51 interconnecting T-Connector 49 with eductor 36. Conduit 53 extends between T-Connector 49 and a hose barb T 56 from which extends conduits 54 and 57. Conduit 54 is in communication with vacuum relief valve 55 whereas conduit 57 connects with vacuum actuator 23. Vacuum actuator 23 is available as Heater Actuator valve from BalKamp, Inc., Indianapolis, Ind.

Figure 5:
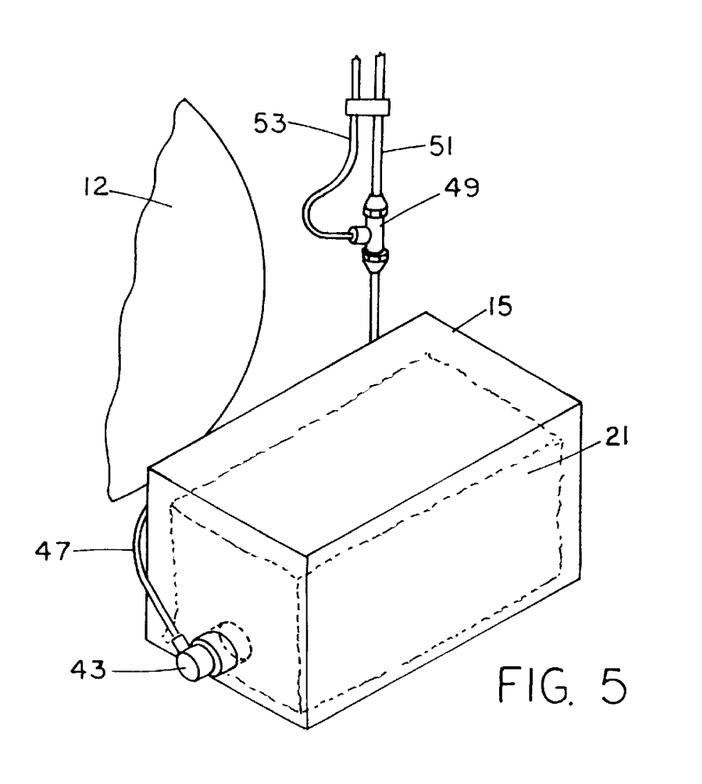
FIGS. 5–8 are detailed views illustrating portions of the shut off assembly.
Figure 6:
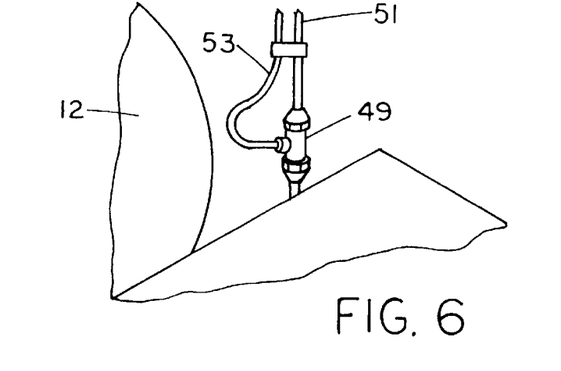
Figure 7:
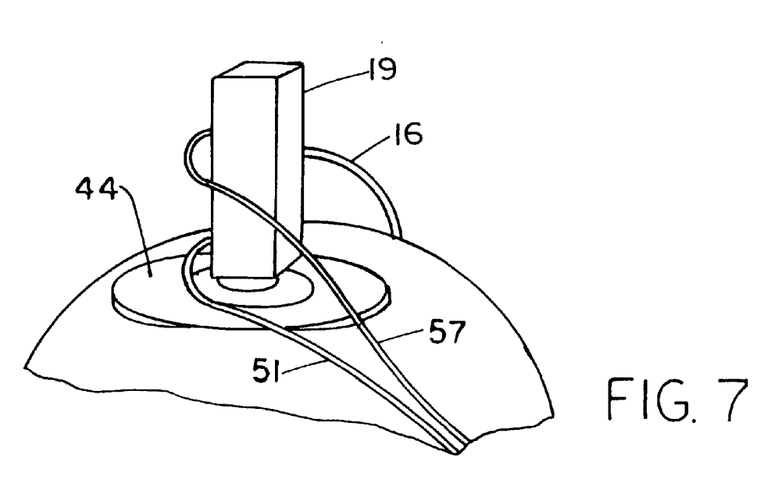

FIGS. 5–7 further show the interconnection of the container 15 and plastic bag 21 with the vacuum shut off valve assembly 20 and the eductor 36 by the previously described conduits 47, 51, 53 and T-connector 49.

Figure 8:
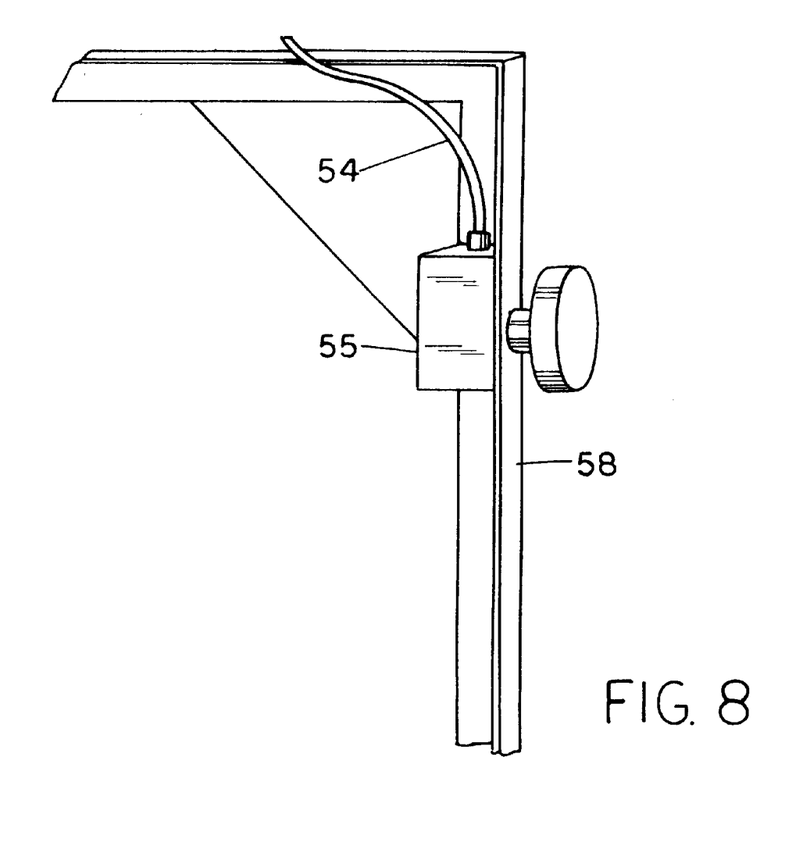

Referring to FIG. 8, it is seen that vacuum relief valve 55 is secured to one of the legs 58 of the table 13.

Figure 9:
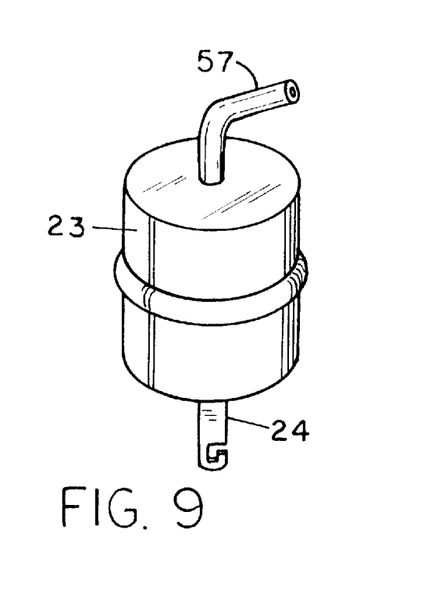
FIG. 9 is a perspective view of a vacuum actuator employed in the shut off assembly.
Figure 10:
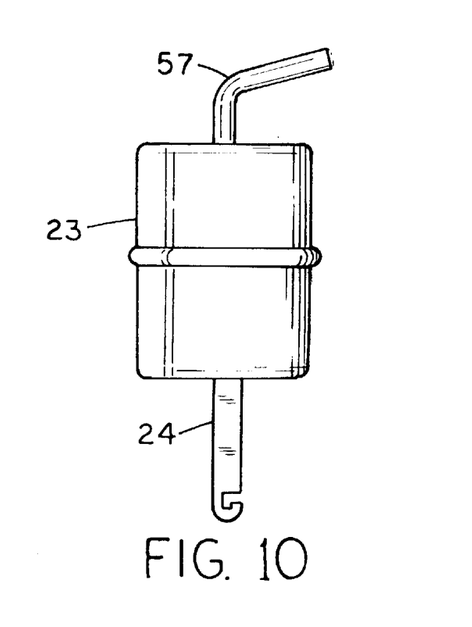
FIG. 10 is a side view of the actuator shown in FIG. 9.
Figure 11:
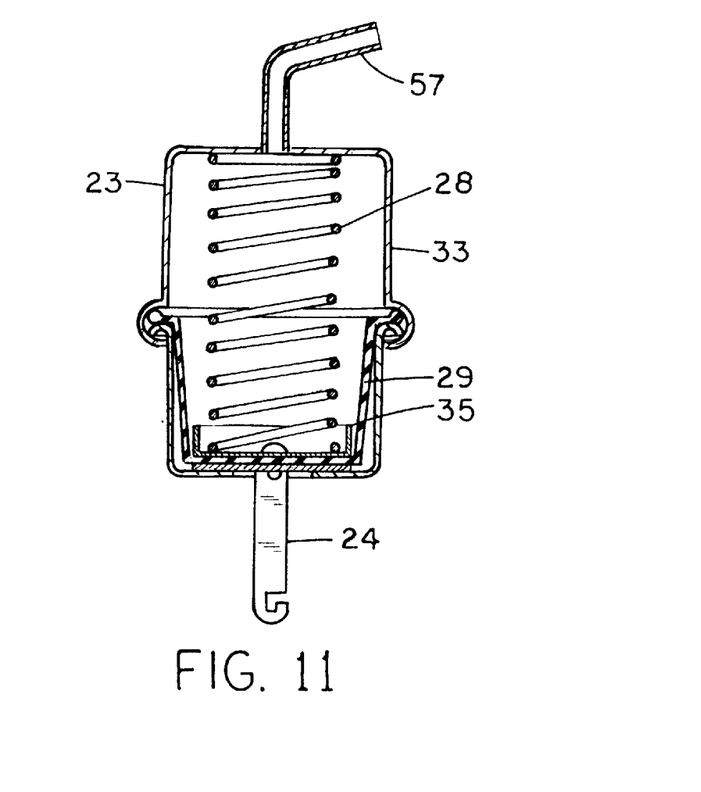
FIG. 11 is a cross sectional view of the actuator shown in FIGS. 9 and 10.

Referring to FIGS. 9–11 the vacuum actuator 23 is shown for actuating shut off assembly 20. It includes a two part housing 33 for spring 28 and diaphragm 29. Seated against diaphragm 29 is cup 35 to which is fastened rod 24.

Figure 12:
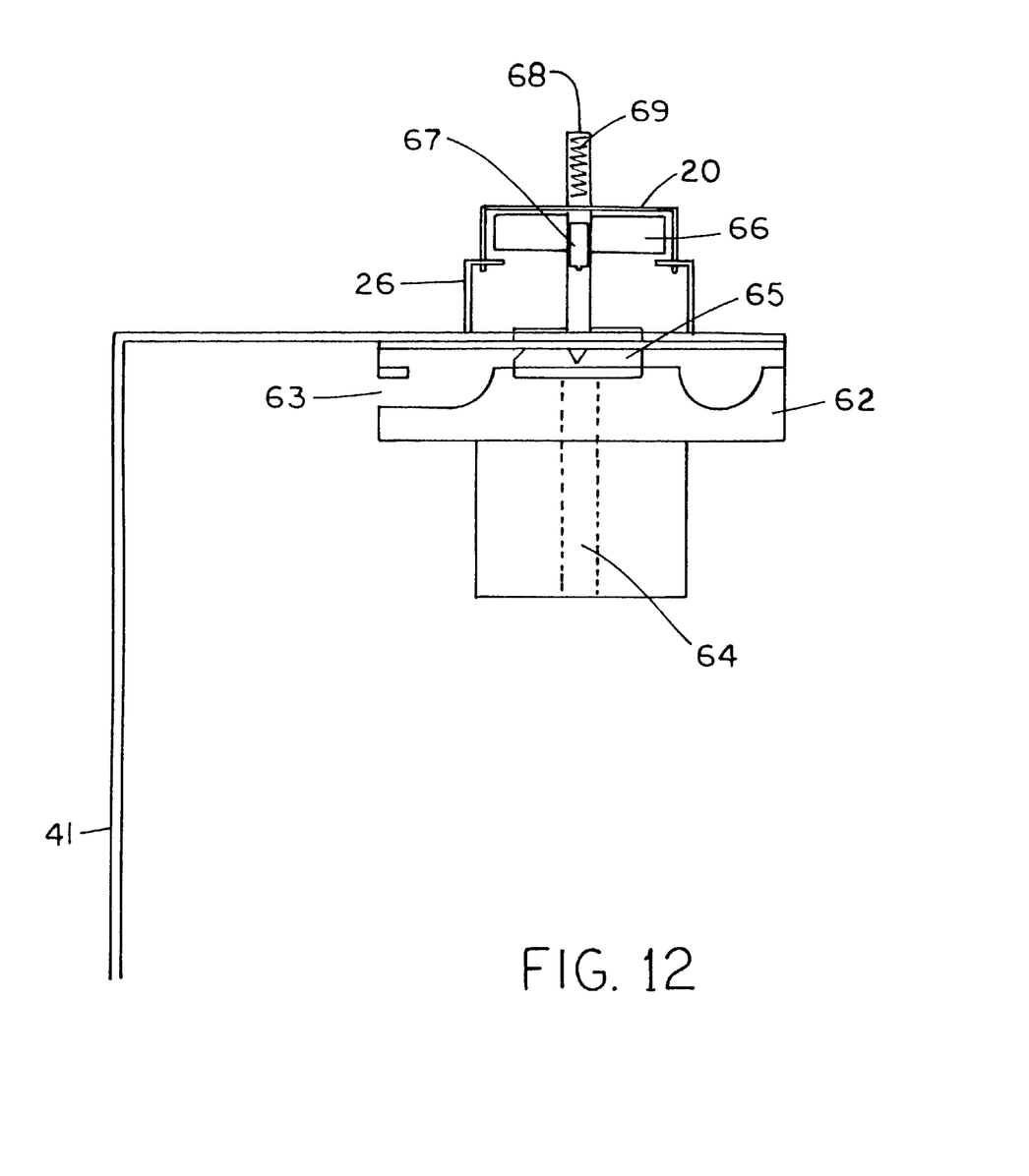
FIG. 12 is a diagrammatic illustration of a shut off valve employed in the shut off assembly.

FIG. 12 illustrates the modified Hydro Minder shut off valve assembly 20. The only modification is the removal of a spring which would rest on magnet 66 and the redesign of the yoke 26 to move magnet 66 up and down in conjunction with yoke 26 and vacuum actuator 23. Otherwise the available valve assembly includes a housing 62 with a water inlet 63 and a water outlet 64. Passage between inlet 63 and outlet 64 is closed and opened by the diaphragm 65 which is pilot pressure controlled with the usual through orifices. When a central orifice is closed by needle valve 67 and the force of spring 68 thereon water pressure will cause the diaphragm 65 to rise allowing water to flow between the inlet 63 and outlet 64. When the needle valve 67 is moved upwardly by yoke 26 and the attraction of magnet 66 on the valve 67 water flows through the orifices equalizing pressure and moving the diaphragm to a closed shut off position.

OPERATION

Figure 13:
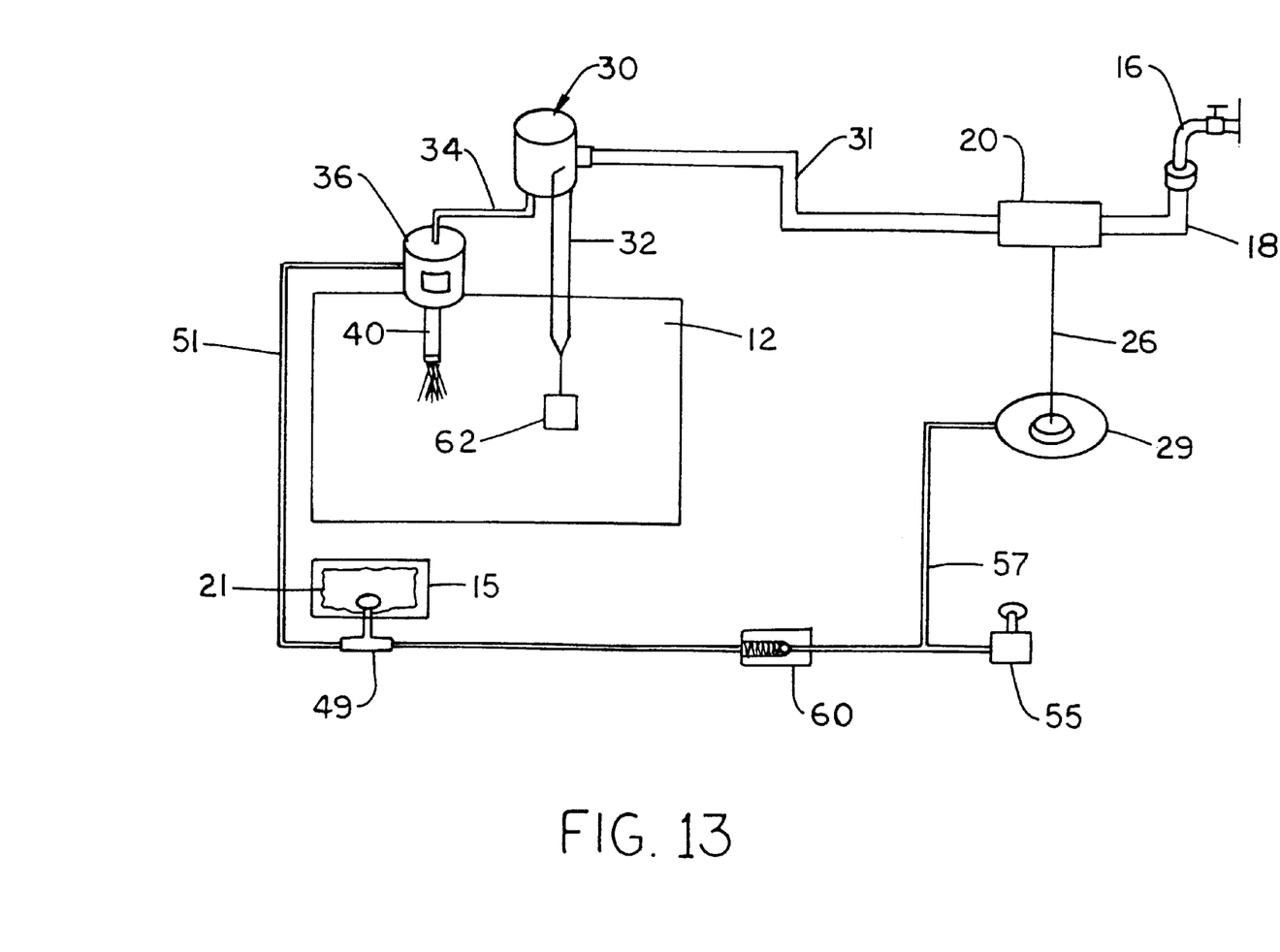
FIG. 13 is a diagrammatic illustration of the shut off assembly of this invention.

A better understanding of the automatic vacuum shut off assembly 10 will be had by a description of its operation in conjunction with the mixing apparatus. With reference to FIGS. 4 and 13, a fluid diluent such as water is supplied under line pressure by hose 16 and passes through inlet connector 18, through vacuum shut off valve assembly 20, conduit 31, float valve assembly 30 and into eductor 36. From eductor 36 water is supplied to tank 12 by means of hose 40. As the water passes through the eductor 36 a reduced pressure is effected in conduit 51. This reduced pressure draws liquid concentrate product from the plastic bag 21 into the eductor 36 for mixing with the water and placement in tank 12. The drawing of product from plastic bag 21 continues until it empties and the bag collapses upon itself. As this is a closed system, when the bag 21 collapses more than 4 in Hg is produced by the eductor 36. When the reduced pressure reaches 5 in Hg the check valve 60 opens and allows the reduced pressure in conduit 57 to pull diaphragm 29 upwardly as well as yoke 26. This actuates the vacuum shut off valve assembly 20 by raising the magnetically attracted needle valve 67. This shuts off water to the rest of the mixing system as previously explained in conjunction with FIG. 12. The system will hold this position until the trapped reduced pressure is vented by the momentary push button valve 55 connected to atmosphere and conduits 54 and 57.

It should be pointed out that the check valve 60 shown in FIG. 13 would be housed in the T-connector 49 and positioned where the conduit 53 connects thereto. Also to be noted in conjunction with FIG. 13 is the float 62 positioned in tank 12 and connected to the float yoke 32. This prevents an overflow of water in the tank 12 by closing the float valve assembly 30 when the water level reaches a predetermined level. The mixing apparatus in conjunction with vacuum shut off assembly 10 can deliver 2.0 to 4.0 gallons per minute of diluent to the tank 12.

An important feature of the shut off assembly 10 is that it operates automatically and without any outside forces or power such as electricity. The system is self contained yet obviates undesired dilution in the instance where the bag 21 empties yet water continues to flow through the eductor. An added advantage of the mixing system afforded in conjunction with the vacuum shut assembly is the ease by which it can be disconnected to a concentrate source and reactivataed. Another added feature is the connection to a mixing tank from which product can be dispensed through hose 14 at the rate of 35 gallons per minute and without any added pressure. The mixing of product and fast delivery is accomplished in a compact system with the only force being that of the pressurize incoming water.

INDUSTRIAL APPLICABILITY

The vacuum or reduced pressure shut off assembly is useful in conjunction with a fluid mixing assembly or system providing an automatic shut off of the system.

The above is considered to be the preferred embodiment of the invention. However, those skilled in the art will appreciate that various changes and modifications can be made without departing from the scope of the invention. For example, while the shut off assembly of this invention has been illustrated for use in conjunction with a specified eductor 36 it is obvious that other eductors can be utilized provided they can afford the necessary pressure reduction. Also, a particular vacuum or reduced pressure shut valve 20 has been illustrated. Any reduced pressure shut off valve could be utilized provided it is operable with an eductor. A float operated valve assembly 30 offers water overflow prevention. It could be eliminated and still have the advantage of the vacuum shut off assembly. Further while a mixing of a particular liquid cleaning composition has been disclosed in conjunction with a water as a diluent, other liquid concentrates could be employed such as floor finish strippers, rest room care products, food processing degreasers and sanitizers, manufacturing plant cleaners, vehicle cleaners, floor finish, carpet cleaners, odor control products and glass cleaners. Neither is it necessary that pressurized water be primary force for mixing with a liquid concentrate. Other pressurized fluids such as hydrocarbon solvents, alcohols, esters, ethers and ketones could be used with a liquid concentrate.

What is claimed is:

1. A reduced pressure shut off assembly for a reduced pressure fluid mixing apparatus comprising:

a first fluid conduit for connection at a first end to a source of a fluid;

an eductor having a fluid inlet, an outlet and a reduced pressure zone, the first fluid conduit connected at a second end to the reduced pressure zone of the eductor;

a second conduit connected at a first end to the first fluid conduit;

a reduced pressure shut off valve connected to the eductor inlet; and a fluid intake conduit connected to the reduced pressure shut off valve, the second conduit connected at a second end to the reduced pressure shut off valve.

2. The reduced pressure shut off assembly as defined in claim 1, wherein the eductor outlet is constructed and arranged to be sealably positioned in a vessel.

3. The reduced pressure shut off assembly as defined in claim 1, further including a second shut off valve connected between the fluid intake conduit and the eductor and in fluid communication therewith.

4. The reduced pressure shut off valve as defined in claim 3, wherein the second shut off valve is float acutated.

5. The reduced pressure shut off valve as defined in claim 1, further including a third conduit connected at a first end to the second conduit and in communication with atmostpheric pressure at a second end.

6. The reduced pressure shut off valve as defined in claim 5 further including a valve member connected to the third conduit.

7. The reduced pressure shut off valve as defined in claim 5 wherein the first, second and third conduits are connected to a common connector.

8. The reduced pressure shut off valve as defined in claim 7 wherein the first conduit is composed of two sections each connected to the common connector.

9. The reduced pressure shut off assembly as defined in claim 1, wherein the reduced pressure shut off valve includes a vacuum activated magnetically operated valve.

10. A reduced pressure shut off assembly for a reduced pressure fluid mixing apparatus comprising:

a first fluid conduit connected at a first end to a source of a first fluid:

an eductor having a fluid inlet, an outlet and a reduced pressure zone, the first fluid conduit connected at one end to the reduced pressure zone of the eductor;

a second conduit connected at a first end to the first fluid conduit;

a reduced pressure shut off valve connected to the eductor inlet;

a fluid intake conduit connected to the reduced pressure shut off valve and to a source of fluid, the second conduit connected at a second end to the reduced pressure shut off valve;

a storage vessel, the outlet of the eductor connected to the storage vessel; and an outlet conduit connected to the storage vessel.

11. The reduced pressure shut off assembly as defined in claim 10 wherein the first fluid is a chemical concentrate.

12. The reduced pressure shut off assembly as defined in claim 11, wherein the fluid intake conduit is connected to a source of water.

* * * * *

UNITED STATES PATENT AND TRADEMARK OFFICE
CERTIFICATE OF CORRECTION

PATENT NO : 6,131,601
DATED : October 17, 2000
INVENTOR(S) : Steven E. Schiller, et al.

It is certified that error appears in the above-identified patent and that said Letters Patent are hereby corrected as shown below:

On the front page, item [73] Assignee
replace "Johson"
with --Johnson--

Signed and Sealed this

Twenty-second Day of May, 2001

Attest:

NICHOLAS P. GODICI

Attesting Officer     *Acting Director of the United States Patent and Trademark Office*